United States Patent
McCann et al.

(10) Patent No.: US 6,343,844 B1
(45) Date of Patent: Feb. 5, 2002

(54) DIAGNOSTIC MODE SELECTOR SYSTEM FOR ANTI-LOCK BRAKE SYSTEMS AND OTHER ELECTRONIC SYSTEMS

(75) Inventors: Gerard O. McCann; James B. Brown, Jr., both of Lafayette, IN (US)

(73) Assignee: Wabash Technology Corporation, Arlington Heights, IL (US)

( * ) Notice: Subject to any disclaimer, the term of this patent is extended or adjusted under 35 U.S.C. 154(b) by 0 days.

(21) Appl. No.: 09/645,897

(22) Filed: Aug. 25, 2000

Related U.S. Application Data

(60) Provisional application No. 60/153,653, filed on Sep. 13, 1999.

(51) Int. Cl.[7] .................. B60T 8/88; B60Q 11/00
(52) U.S. Cl. ..................... 303/122.02; 340/458
(58) Field of Search ............... 188/1.11 E; 303/122, 303/122.01, 122.02; 324/503, 504; 340/425.5, 438, 458–479; 701/29, 31, 34, 71, 76

(56) References Cited

U.S. PATENT DOCUMENTS

| | | | |
|---|---|---|---|
| 5,371,487 A | * 12/1994 | Hoffman et al. | 340/425.5 |
| 5,670,939 A | * 9/1997 | Rodewald et al. | 340/479 |
| 5,801,624 A | * 9/1998 | Tilly et al. | 340/479 |
| 5,941,612 A | * 8/1999 | Carpenter | 303/122 |
| 6,043,661 A | * 3/2000 | Gutierrez | 324/504 |
| 6,114,952 A | * 9/2000 | Francesangeli et al. | 340/453 |

OTHER PUBLICATIONS

Page 15 of an Eaton Service Manual's Illustrated Parts List for Antilock Brake Systems (Jun. 1998) A page from and Eaton Service Manual (no dated).

* cited by examiner

*Primary Examiner*—Christopher P. Schwartz
(74) *Attorney, Agent, or Firm*—Trexler, Bushnell, Giangiori, Blackstone & Marr, Ltd.

(57) ABSTRACT

A novel diagnostic system for a trailer is provided by the present invention. The trailer includes a micro controller which is part of an anti-lock brake system of the trailer. A warning light is provided on the trailer and is in electrical connection with the micro controller. A switch is provided proximate to the warning lamp. The switch can be activated by a technician to provide a short across the warning lamp. A stored program within the micro controller recognizes the short and performs a diagnostic function in response thereto by flashing the warning lamp in a predetermined manner.

18 Claims, 4 Drawing Sheets

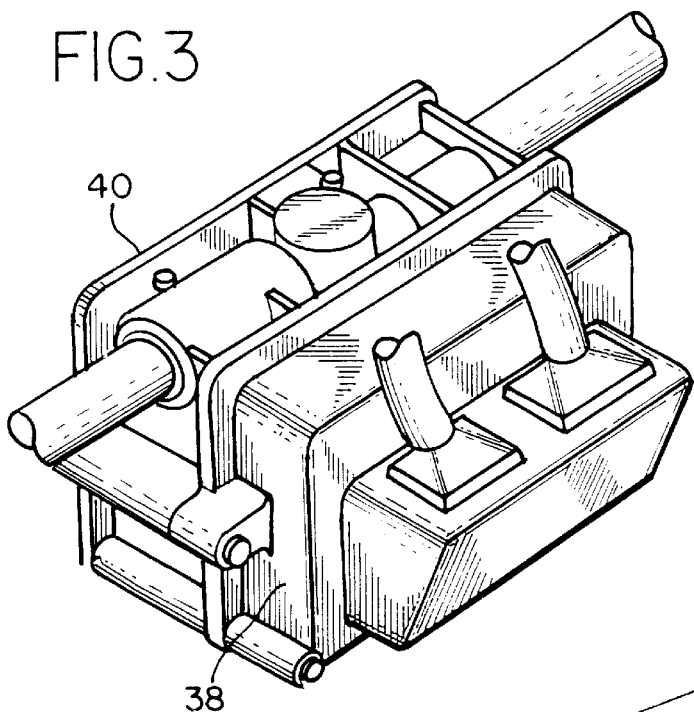
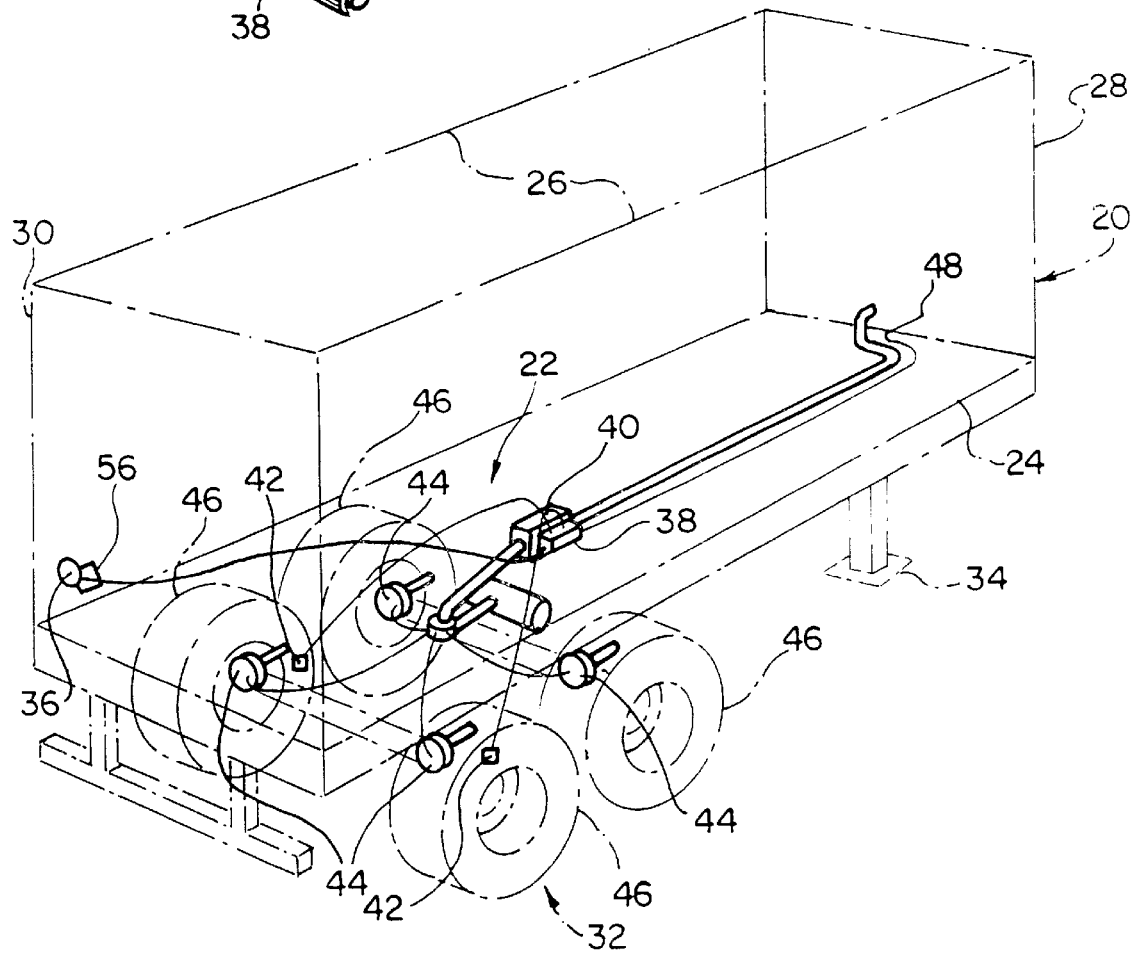

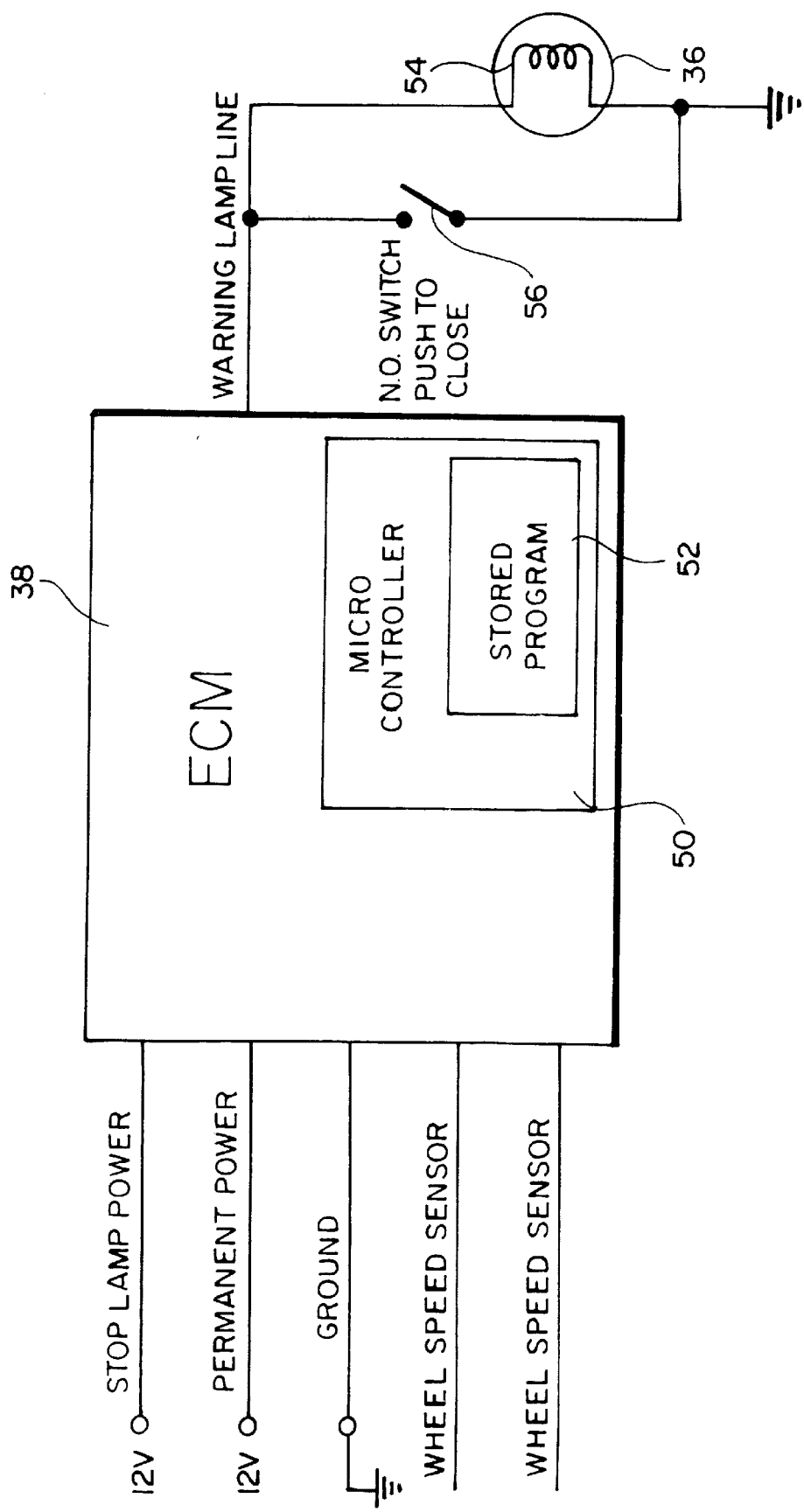

DIAGNOSTIC MODE SELECTOR SYSTEM FOR ANTI-LOCK BRAKE SYSTEMS AND OTHER ELECTRONIC SYSTEMS

This application claims the priority of Provisional Application Ser. No. 60/153,653 filed on Sep. 13, 1999 and entitled "Diagnostic Mode Selection For Anti-Lock Brake System And Other Electronic Systems".

BACKGROUND OF THE INVENTION

Anti-lock brake systems (ABS) for air braked truck trailers are in common use and generally include an Electronic Control Module (ECM), Pneumatic Control Module (PCM) and wheel speed sensors. The various components may be known by different names, for example the ECM is sometimes called the Electronic Control Unit (ECU). The PCM may be known as a modulator. Some ABS implementations integrate the PCM into another component known as the relay valve. In this case the pneumatic component is sometimes called a modulating relay valve.

The wheel speed sensors provide wheel speed information to the ECM and the ECM signals the PCM to modify air pressure level at the brake chambers. This process controls the braking level so that the wheels continue to rotate. The overall process is described in detail in numerous patents and in the pending U.S. patent application Ser. No. 09/306,921.

On air-braked truck trailers in use today, a warning lamp is provided which normally goes through a bulb check sequence at startup, but otherwise illuminates only if there is a problem. The main purpose of the warning lamp is to alert the driver and/or maintenance personnel to an ABS fault. The driver can then drive more cautiously until the ABS is repaired. To avoid driver confusion, the warning lamp does not normally provide any kind of troubleshooting information which might be helpful in repairing the ABS. The warning lamp is strictly a go/no go indicator.

The warning lamp is subject to regulation in the United States on trailers. In the United States, the warning lamp is required to be at a particular location towards the left rear of the trailer and it is not normally visible from the cab of the tractor. The driver or maintenance person has to walk by the left rear of the trailer for a periodic inspection of the warning lamp.

When an ABS failure does occur, maintenance personnel need to troubleshoot the ABS so that the faulty components can be repaired or replaced. The warning lamp normally provides little help as it is purposely designed to provide a simple failure indication. To avoid driver confusion, detailed troubleshooting information is not normally provided.

Various manufacturers have approached the diagnostic problem in similar ways, but with subtle differences.

A trailer ABS marketed in North America by Bosch/Eaton sometimes includes an additional 2-wire cable which puts the ECM and warning lamp into a diagnostic mode when the two pins are shorted together. Depending on the fault, a series of flash codes is output by the warning lamp to identify the particular problem. Driver confusion is not an issue as this is a special mode of operation which cannot occur without deliberate action by maintenance personnel.

Wabco uses a mechanism where a particular power-up sequence puts the ABS into a diagnostic mode. This relies on the fact that for ABS on North American trailers, the ECM receives electrical power from the stop lamp supply line and from an auxiliary electrical supply line which is intended to have power at all times when the ignition in the tractor is switched on, see FIG. 1. The stop lamp supply line is only powered when the brakes are applied by the operator. The auxiliary supply line is a better source of power but when the trailer is coupled to an older tractor, the auxiliary supply line may not be available. Hence, the requirement for stop lamp power is considered to be a backup. The Wabco diagnostic approach requires that the trailer first be coupled to a suitable tractor which can power the auxiliary supply line. The brakes are applied without turning on the ignition. Thereafter, the ignition is switched on and off a specified number of times to induce a particular diagnostic mode. For example, the display of failures which currently exist may constitute one diagnostic mode. The display of failures which previously existed but are no longer present may constitute another diagnostic mode. A significant disadvantage with this approach is that it is a two-person operation. An operator sits in the tractor and operates the brakes and ignition key while an observer at the rear of the trailer notes warning lamp behavior.

Another approach which is available with most existing systems is to use a diagnostic data link so that the ECM communicates with a separate diagnostic computer in the trailer maintenance shop. This may be a general purpose computer running a special program or it may be a dedicated piece of test equipment. This technique can provide very precise diagnostic information. A disadvantage is that the diagnostic computer is required. Also, connecting the computer to the vehicle is also not a trivial task under the conditions which prevail in the trailer maintenance shop. Another disadvantage is that, from an economic and design perspective, a special harness and connector is required on every trailer to provide for the computer hook-up to the trailer. A high quality harness and connector are required to ensure that reliable connections can be made after many miles of service in an over the road environment. This harness and connector can be a significant portion of the overall system cost.

An ECM for an ABS is normally designed to tolerate all, or almost all, possible miswiring possibilities. This includes the possibility of a short across the warning lamp. The occurrence of such a short on some portion of the trailer population can reasonably be expected as the wire from the ECM to the warning lamp often follows a long and tortuous path through the trailer. On most North American trailers, one side of the warning lamp is permanently connected to ground (to the chassis) while the ECM provides the switched 12-volt supply to the warning lamp. This arrangement allows for the use of only one wire from the ECM to the warning lamp and a short connection from the warning lamp to a convenient grounding point on the chassis. If the wire gets pinched anywhere as the wire is routed through the chassis, then the 12-volt feed is shorted to ground. Most electronic components used as switches would be destroyed in such circumstances. The ECM of an ABS, however, is generally designed to tolerate such abuse. When the short is removed the ECM will work satisfactorily and will again illuminate the warning lamp as originally designed.

The electronic circuitry which implements this short circuit protection requires significant complexity. If electric current is simply limited to a value which is safe for the component involved, then heat dissipation in that component and in the ECM becomes significant. For example if a one amp limit is chosen, then for the twelve volt systems used in North America, heat dissipation is approximately twelve watts. With suitable heat sinking, this can be handled. However, substantial cost and complexity have to be added to the ECM which may not otherwise require any heat sinking over and above the printed circuit board itself. Cost and complexity of the final assembly operation for the ABS is also increased. If no heat sinking is required, then final assembly can consist of simply putting a printed circuit board in a suitable box. If heat sinking is required, electronic components my have to be attached mechanically to the metal box and electrically connected to the printed circuit board. This adds assembly cost, introduces tolerance difficulties and may also detract from durability under the harsh shock and vibration environments encountered on a trailer.

Some designs of the ECM avoid the use of heat sinking by recognizing that a short exists and then reducing the current to a level close to zero, basically turning off the drive. This recognition requires either that there be complex analog and/or digital circuitry in the design or that the increase in current is somehow communicated to a microprocessor or micro controller which then turns off the drive under software control. Typically this latter approach requires that relatively simple analog circuitry limit the current to some appropriate initial level. This provides protection for the device for a short time (of the order of milliseconds) in that its current carrying capacity is not exceeded. However, the power dissipation is perhaps an order of magnitude higher than the device can survive under steady state conditions. The micro controller then determines that this condition exists and turns off the device before the enormous dissipation has elevated the device temperature to unsafe levels. This is the approach taken with current and anticipated future ABS products manufactured by the present Assignee.

For a warning lamp drive there is an additional level of complexity in that an incandescent bulb has a very low resistance when power is first applied. Consequently, the warning lamp has a large inrush current when turned on. As the filament warms up, resistance increases and the current reduces to the normal level. Any short detection mechanism must allow for the initial inrush current and allow current to flow at an acceptable level until the filament warms up.

The present invention utilizes the significant complexity just described to provide the additional function of a switched input signal to the ECM without the use of any additional wiring. This input signal is used to select different diagnostic modes for the ECM. The input signal can be used for other purposes. Other features and advantages of the present invention will become apparent upon reading the attached specification, in combination with a study of the drawings.

OBJECTS AND SUMMARY OF THE INVENTION

A general object of the present invention is to provide a novel system for selecting a diagnostic mode on a vehicle, such as a trailer.

An object of the present invention is to provide a novel diagnostic system for a vehicle, such as a trailer, which uses an existing warning lamp and existing wiring on the vehicle.

An object of the present invention is to provide a novel diagnostic system for a vehicle, such as a trailer, which communicates with a technician once a short is applied by the technician to the system.

Briefly, and in accordance with the foregoing, the present invention discloses a novel diagnostic system for a vehicle, such as a trailer. The system includes a micro controller which is part of an anti-lock brake system of the trailer. A warning light is provided on the trailer and is in electrical connection with the micro controller. Means for applying a short, such as a switch, is provided proximate to the warning lamp. The short applying means can be activated by a technician to provide a short across the warning lamp. A stored program within the micro controller recognizes the short and performs a diagnostic function in response thereto by flashing the warning lamp in a predetermined manner.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which:

FIG. 2 is a perspective view of a trailer showing an anti-lock brake system thereon which incorporates the features of the invention;

FIG. 3 is an enlarged perspective view of a portion of the anti-lock brake system shown in FIG. 2;

FIG. 4 is an electrical circuit diagram showing an implementation of the present invention.

DETAILED DESCRIPTION OF THE ILLUSTRATED EMBODIMENT

Figure 1:
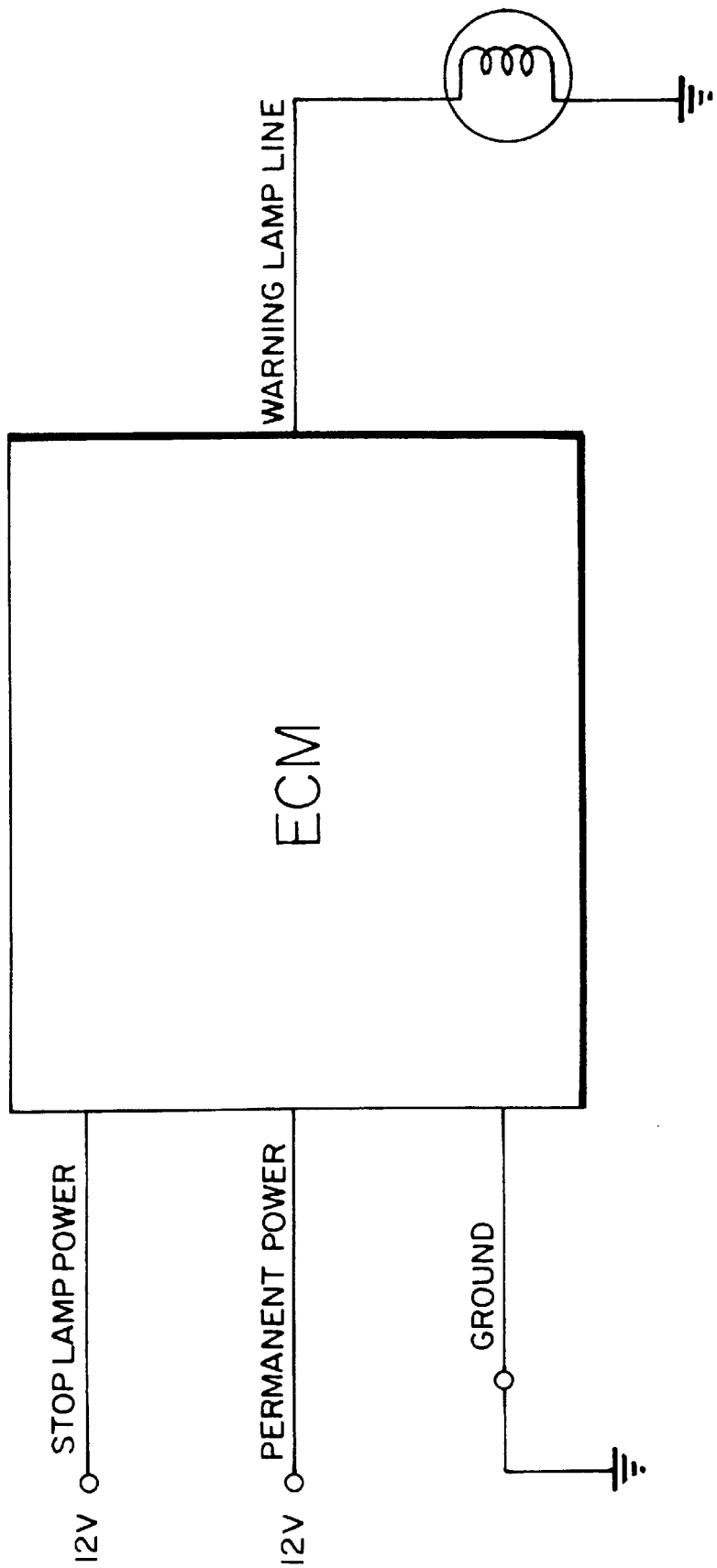
FIG. 1 is a schematic showing an electrical trailer interface for a prior art North American trailer anti-lock brake system.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

As illustrated in FIG. 2, the present invention provides a vehicle 20, shown as a trailer, having an anti-lock brake system (ABS) 22 thereon. The trailer includes a floor 24, opposite sidewalls 26 which extend upwardly from the floor, a front wall 28 which extends upwardly from the floor 24 and rear doors 30. A rear undercarriage assembly 32 is provided under the rear portion of the floor 24 and an expandable and retractable landing gear 34 is provided under a front portion of the floor 24. The trailer 20 has a warning lamp 36 provided towards the rear of the sidewall 26 and to the left of the driver. The warning lamp 36 is not normally visible from the cab of the tractor (not shown).

The ABS 22 generally includes an Electronic Control Module (ECM) 38, Pneumatic Control Module (PCM) 40, see also FIG. 3, and wheel speed sensors 42. The various components may be known by different names, for example the ECM 38 is sometimes called the Electronic Control Unit (ECU). The PCM 40 may be known as a modulator. Some ABS implementations integrate the PCM into another component known as the relay valve. In this case, the pneumatic component is sometimes called a modulating relay valve.

The wheel speed sensors 42 provide wheel speed information to the ECM 38 and the ECM 38 signals the PCM 40 to modify air pressure level at the brake chambers 44 on the wheels 46 of the trailer 20. This process controls the braking level so that the wheels 46 continue to rotate. The overall process is described in detail in numerous patents and in pending U.S. patent application Ser. No. 09/306,921, which disclosure is herein incorporated by reference.

An electrical connector 48 between the tractor and the trailer 20 is provided. This electrical connector 48 is defined by the Society of Automotive Engineers (SAE) J560 standard and the following circuits are available:

| 1 White | Ground return to tractor |
|---|---|
| 2 Black | Clearance, side marker and identification lamps |
| 3 Yellow | Left turn signal and hazard lamps |
| 4 Red | Stop lamps (and ABS power) |
| 5 Green | Right turn signal and hazard lamps |
| 6 Brown | Tail and license plate lamps |
| 7 Blue | Auxiliary |

The RCM 38 receives electrical power from the stop lamp supply line (4) (see FIG. 4 wherein this line is identified as "Stoplamp Power") and from the auxiliary electrical supply line (7) (see FIG. 4 wherein this line is identified as "Permanent Power") which is intended to have power at all times when the ignition in the tractor is switched on. As shown in FIG. 4, the ECM 38 is also connected to ground (1).

Figure 5:
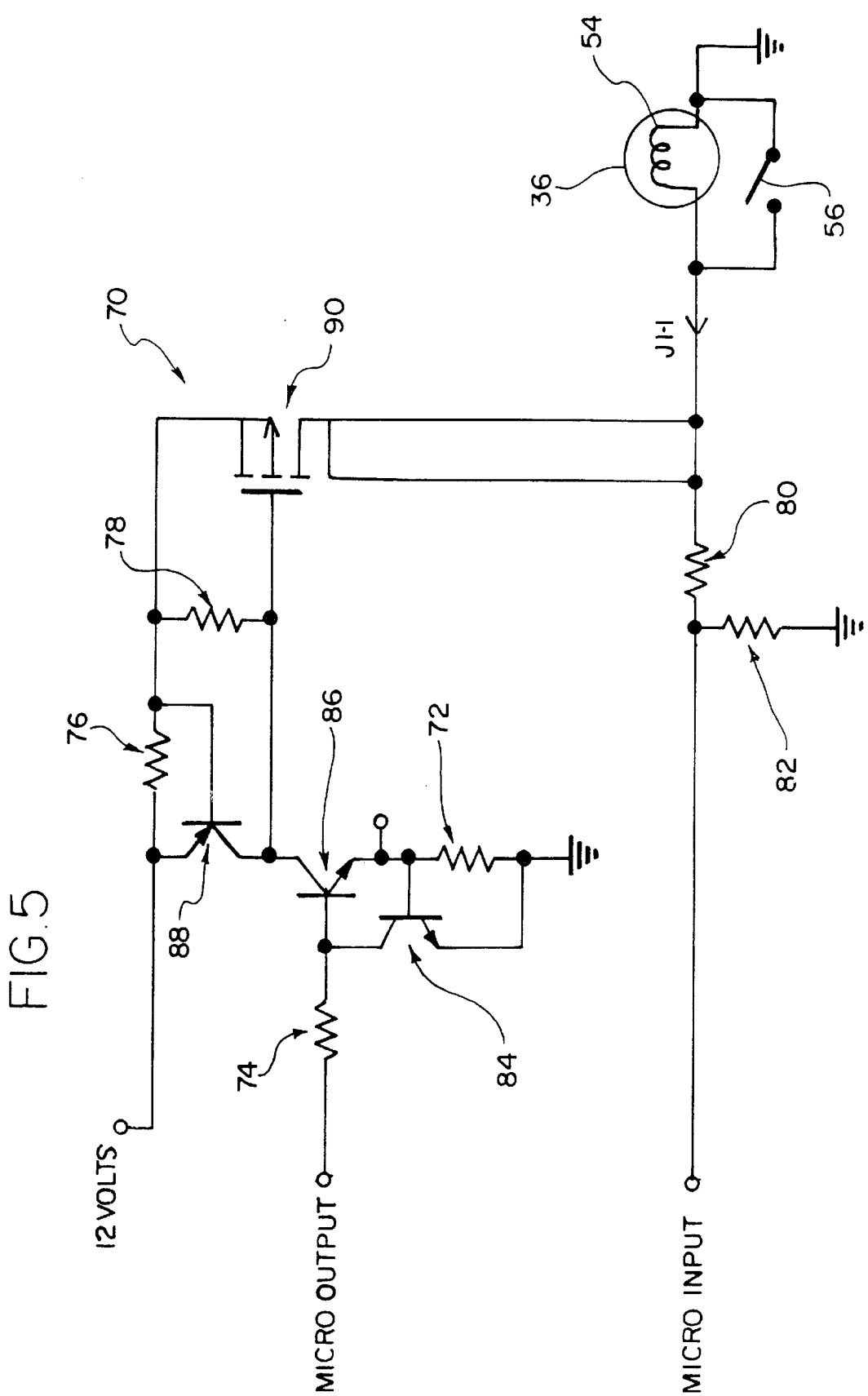
FIG. 5 is a schematic showing an electrical trailer interface for a North American trailer anti-lock brake system with a switch for applying a short across the warning lamp in accordance with the features of the present invention.

The ECM 38 of the present invention includes a micro controller-based short recognition scheme. The micro controller 50 has a stored program 52 therein which is used as described herein. FIG. 5 shows a schematic of an electronic circuit 70 which provides one possible implementation of the warning lamp drive required for this short recognition scheme. The electronic circuit 70 receives power from a nominal twelve-volt supply. The ground of the supply is connected to the points shown with ground symbols. The warning lamp filament 54 of the warning lamp 36 is connected between the point marked J1-1 and ground, and is in parallel with means for applying a short 56, shown in FIGS. 4 and 5 as a normally open switch.

As shown in FIG. 5, the electronic circuit 70 includes 100 ohm resistor 72, 10 k ohm resistor 74, 0.51 ohm resistor 76, 10 k ohm resistor 78, 10 k ohm resistor 80, 3.32 k ohm resistor 82, BC848A transistor 84, MMBTA42LT1 transistor 86, MMBTA92LT1 transistor 88, and P Channel S19948AEY MOSFET 90. The MOSFET 90 can be a MOSFET manufactured by Siliconix. It is to be understood that one of ordinary skill in the art may use different values for these elements in electronic circuit 70. It is also to be understood that the electronic circuit 70 shown in FIG. 5 is representational and one of ordinary skill in the art could devise another suitable electronic circuit.

First the situation where the warning lamp 36 is required to be off is described. The micro controller 50 output is held at zero volts under control of the stored program 52. This ensures that no current flows into the base of transistor 86 so transistor 86 remains off. Since no current flows through transistor 86, the collector of transistor 86 remains at a high voltage because of the presence of resistor 78. Essentially, no voltage is developed across resistor 78. Thus, the gate of MOSFET 90 is at the same potential as its source. Consequently, MOSFET 90 maintains a high resistance between its source and drain connections so the drain remains at a low voltage because of the warning lamp 36 connected between J1-1 and ground and also because of the presence of resistor 80 and resistor 82. The input of the micro controller 50 is periodically checked under control of the stored program 52 for consistency with what is expected. The input of the micro controller 50 is at a low voltage which is consistent with the fact that the warning lamp 36 is switched off. The preferred implementation of the input of the micro controller 50 is as an analog to digital port. Such ports are available on many micro controllers.

If the warning lamp 36 is required to be in a steady state on condition and no short exists, the output of the micro controller 50 is held high under control of the stored program 52. This causes base current to flow through resistor 74 which turns on transistor 86. This sinks current from resistor 78 to ground so that a voltage is developed between the source and gate of MOSFET 90. Thus, the connection between the source and the drain of MOSFET 90 has a low resistance. Current flows from MOSFET 90 through the warning lamp 36 to ground and the warning lamp 36 remains illuminated. The input of the micro controller 50 now has a significant voltage and this is consistent with the fact that the warning lamp 36 is on.

The situation where the warning lamp 36 is on and a short is applied is now described. The current is no longer limited by the resistance of the warning lamp filament 54 and immediately increases to a level of about 1.2 Amps. At that point, the voltage across resistor 76 rises to about 0.6 volts which turns on transistor 88. Transistor 88 floods the collector of transistor 86 with current, which also flows through resistor 72 causing the voltage of resistor 72 to rise which turns on transistor 84 when the current through resistor 72 has reached a level of about 6 mA. This, in turn, pulls the base of transistor 86 low which tends to turn off transistor 86. This causes the collector of transistor 86 to rise which tends to turn off MOSFET 90. The whole system seeks a condition where the current level through resistor 76 is just enough to turn on transistor 88—about 1.2 amps. The loop gain of the circuit shown is such that current level oscillation does occur but nevertheless remains within a safe current level for MOSFET 90. The average heat dissipation in MOSFET 90 rises to twelve watts which is about an order of magnitude greater than its steady state capability when mounted to a printed circuit board. Because of thermal inertia, however, there is some delay before the junction temperature of MOSFET 90 rises to a level where the MOSFET 90 would be destroyed. Meanwhile, the input of the micro controller 50 which is periodically checked under control of the stored program 52 no longer has the expected high voltage level. Because of this, the output of the micro controller 50 is eventually driven low under control of the stored program 52 with the result that MOSFET 90 turns off before the junction temperature of MOSFET 90 reaches unsafe levels. It should be noted that it would not be possible to rely totally on the micro controller 50 to provide this protection. Before the micro controller 50 would have time to react, the current would have reached dangerous levels and the MOSFET 90 would immediately be destroyed.

It is also necessary to consider the conditions which prevail as the warning lamp 36 is turned on with no short present. Just after the output of the micro controller 50 goes high, the filament 54 within the warning lamp 36 acts like a partial short and the current reaches a level such that resistor 76 in conjunction with transistor 88 implement the current limit condition. The input of the micro controller 50 is initially low, but rapidly increases as the filament 54 warms up and the resistance of the filament 54 increases. By using a combination of a suitable time delay and selecting a suitable threshold voltage, the micro controller 50 allows the warning lamp 36 to pass through the initial warm-up period without triggering a shut-down of the warning lamp drive.

It will be seen from the above that the existence of the short is known to the stored program 52 embedded within the micro controller 50. Since the micro controller 50 has to make the decision to turn off the warning lamp drive, by design, the micro controller 50 is aware of the existence of the short circuit. This information, which already exists in prior art systems, is utilized in the present invention to select a particular diagnostic mode for the system.

In FIGS. 4 and 5, the short applying means 56 is shown as a normally open switch. The switch 56 is provided proximate to the warning lamp 36 on the trailer 20. When the switch 56 is closed by an operator, a short from the warning lamp power wire to ground occurs. This adaptation of the prior art system shown in FIG. 1 is shown as the present invention in FIG. 5. By inputting a sequence of shorts, for example two, three or four, various diagnostic modes can be selected because the stored program 52 is programmed in the present invention to recognize the sequences to enter into the desired diagnostic mode. The technician presses the switch 56 to close and open the switch 56 the appropriate number of times to select the desired diagnostic mode. The stored program 52 recognizes the desired diagnostic mode and begins to blink or flash the warning lamp 36 in the appropriate coded sequence to enable the technician to determine what problems occurred with the trailer 20 during operation. Signals are conveyed from sensors, such as the wheel speed sensors 42, provided on the trailer 20 and are connected to the ECM 38. The micro controller 50 within the ECM 38 determines what problems occurred during operation and it is this information which is conveyed to the technician by the blinking or flashing of the warning lamp 36 in the appropriate coded sequence.

The system of the present invention functions in the situation where there is a fault in the trailer ABS 22 and the warning lamp 36 is already turned on. It may also be desirable, however, to enter a particular diagnostic mode when no fault is present, for example to check for previous faults which no longer exist. The ECM 38 used in the present invention accomplishes this by putting short "on" pulses on the warning lamp 36 even if the warning lamp 36 is supposed to be off. By keeping these short, of the order of a millisecond, no appreciable filament 54 heating occurs so the warning lamp 56 remains off to the human eye.

The system of the present invention can distinguish between a "real" short due to faulty wiring and a short induced by the short applying means 56. If a short exists for whatever reason, then the short is recognized as such and the drive to the warning lamp 36 is turned off. However, the system periodically (several times per second) checks to see if the short is still present. If it is a "real" short, it may be not be a permanent condition. For example, if a technician changes a bulb while the system is powered up, the terminals of the bulb connector may contact the frame of the trailer 20 and cause a short while the bulb replacement operation is in progress. When the operation is completed, the short is no longer present. The design of the present system is such that, if a fault is present, the bulb will illuminate again as soon as the short is removed. In principle, the only difference with the short applying means 56 is that the short is deliberately applied and removed in accordance with instructions in the system technical manual. By timing the duration of the shorting events and counting the shorting events, the system enters the appropriate diagnostic mode and suitably flashes the warning lamp 36 to provide the diagnostic information.

The system of the present invention also correctly handles shorts which may occur while the system is in diagnostic mode. Assuming that the system is in diagnostic mode and no short is present, the warning lamp 36 will flash as expected. If a short is present, however, the system will be aware of the short and the stored program 52 will not flash the warning lamp 36.

With regard to the possibility that the system might misinterpret a "real" short as an instruction to enter diagnostic mode, a number of safeguards are in place. First, the trailer 20 needs to be stationary to place the system in diagnostic mode. Once the trailer 20 starts to move, entry to diagnostic mode is prohibited by the stored program 52. While the trailer 20 is stationary, an intermittent short which exactly matched the required short applying means 56 input sequence would have to occur. This is highly unlikely as intermittent shorts normally occur due to vibration from motion of the trailer 20. In a worst case situation, if the system somehow erroneously enters diagnostic mode, this is not catastrophic. Behavior of the warning lamp 36 would be affected for approximately one minute, but ABS 22 function is not affected in any way. The system still functions as a normal ABS.

The details of the wiring and the overall design of the ECM 38 may dictate that some additional components be added to reliably implement the warning lamp drive. Depending on how the stored program 52 samples the input of the micro controller 50, a suitable capacitor may, or may not, be needed across resistor 82 to damp out the effect of the current oscillations mentioned above. If the nominal twelve-volt supply shown is not well isolated from the raw vehicle supply elsewhere in the ECM 38, then a suitable zener diode may need to be added across resistor 78 to protect the gate of MOSFET 90 from excessive voltage. These details depend on the exact design and can be easily implemented by one skilled in the art. It should be noted that numerous detailed implementations are also possible, some of which may look very different from the schematic presented.

Numerous implementations are also possible for implementing the deliberate short. A switch can be built into the warning lamp 36, or into the wiring harness close to the warning lamp 36. Alternatively, the wire from the warning lamp line can hang therefrom (such that the switch is eliminated). To apply the short, the hanging wire is engaged with the chassis of the trailer 20. The hanging wire can be surrounded by an insulating shroud, can have a cap removably attached thereto, or the like, to prevent unintentional shorts. The shroud can have an open end into which a rivet end or the like is inserted to cause the short.

It should also be noted that placing the short applying means 56 at or near the warning lamp 36 is an ideal location, as the technician needs to observe the warning lamp 36 to gain information from the diagnostic mode. The warning lamp 36 will provide a particular flash pattern to indicate the nature of the fault. The system technical manual advises the technician of the meaning of the flash pattern.

The warning lamp 36 on North American trailers is in a very accessible location on the side of the trailer 20. The warning lamp 36 is at a convenient height for a technician so that the technician can remain standing while activating the short applying means 56. The technician is not required to stoop down or kneel which would be the case if the short applying means were close to the location of the ECM 38 which is underneath the trailer 20. In fact, a long run of wire is required between the ECM 38 and the warning lamp 36. It should be noted, however, that no additional wiring is required, as this wire from the ECM 38 to the warning lamp 36 already exists. As such, the present invention utilizes the significant complexity in the electronics and wiring which is already required to implement a reliable warning lamp drive.

While this system has been described in the context of a trailer ABS 22, it is in fact applicable to any ECM. A wire with a given output drive function may be used to provide any kind of input information to the ECM. More specifically, a warning lamp drive may be used to put the ECM into a different mode. This might be a diagnostic mode but, even within the context of ABS technology, various other modes are envisaged.

For an ABS on either a passenger car or a truck, a traction control system is frequently offered either as a standard addition or as an option. Traction control systems limit engine torque under poor traction conditions so that wheel spin is minimized. Drive axle brakes are sometimes utilized to help slow down spinning wheels. Such systems are generally implemented as additions to ABS because wheel speed information is already known to the ECM of the ABS and, also, most of the pneumatics or electronics required to apply a controlled braking torque already exist. Switches are sometimes fitted on the dash to allow the driver to enable or disable the traction control function. These are advantageous, as some traction control systems may not work well under all conditions. For example, in some circumstances, it may be desirable to spin a drive wheel to try to melt a thin layer of ice so that the tire surface gets down to dry pavement. Drivers of sports cars may also want the option of retaining the perceived fun factor associated with being able to spin the drive wheels. On such systems, both ABS and traction control warning lamps are normally required on the dash. When the present invention is used in this type of system, the traction control disable switch is arranged to put a short across either of the power lines going to the warning lamps. This would save the cost and space of an additional wire in the dash harness and would also save a connector pin in the ECM. A similar arrangement can be used to put a passenger car or truck ABS into a special diagnostic mode.

While most of the foregoing discussion has applied to a warning lamp drive, the present invention can be used to add input capability to any output drive line. The most economical implementation is in a situation where output short circuit protection is already required. However, such functionality can be added to any output drive so as to utilize the invention.

While a preferred embodiment of the present invention is shown and described, it is envisioned that those skilled in the art may devise various modifications of the present invention without departing from the spirit and scope of the appended claims.

The invention claimed is:

1. A system for a vehicle comprising:
    a micro controller on the vehicle, said micro controller having a stored program therein;
    a warning lamp on the vehicle, said warning lamp being in electrical connection with said micro controller by a first line and being connected to ground by a second line;
    means for providing at least one short across said warning lamp by connecting said first line to said second line, said stored program configured to recognize said at least one short and perform a function in response thereto.

2. A system as defined in claim 1, wherein said stored program is configured to perform a diagnostic function by flashing said warning lamp in a predetermined manner.

3. A system as defined in claim 1, wherein said means comprises a switch which is configured to be depressed by an operator.

4. A system as defined in claim 3, wherein said switch is proximate to said warning lamp.

5. A system as defined in claim 1, wherein said micro controller is part of an anti-lock brake system.

6. A vehicle comprising:
    a micro controller on the vehicle, said micro controller having a stored program therein;
    a warning lamp on the vehicle, said warning lamp being in electrical connection with said micro controller by a first line and being connected to ground by a second line;
    means for providing at least one short across said warning lamp by connecting said first line to said second line, said stored program configured to recognize said at least one short and perform a function in response thereto.

7. A vehicle as defined in claim 6, wherein said stored program is configured to perform a diagnostic function by flashing said warning lamp in a predetermined manner.

8. A vehicle as defined in claim 6, wherein said means comprises a switch which is configured to be depressed by an operator.

9. A vehicle as defined in claim 8, wherein said switch is proximate to said warning lamp.

10. A vehicle as defined in claim 6, wherein said micro controller is part of an anti-lock brake system.

11. A vehicle as defined in claim 6, wherein said stored program is configured to perform said function only if said vehicle is stationary.

12. A system for diagnosing a brake system on a vehicle, said system comprising:
    a warning lamp on the vehicle connected to ground by a first line;
    a micro controller connected to said warning lamp by a second line;
    means for providing a short across said warning lamp on the vehicle by connecting said first line to said second line;
    said micro controller being connected to the brake system and configured to operate in a plurality of diagnostic modes, said micro controller connected to said short applying means by said second line, said micro controller configured to detect a number of times said short applying means is actuated and enter into one of said diagnostic modes depending on the number of times said short applying means is actuated, said micro controller configured to subsequently activate said warning lamp a number of times thereby indicating problems which have been detected relating to the brake system.

13. A system as defined in claim 12, wherein said short applying means is generally proximate the warning lamp, thereby providing that said short applying means can be actuated while said warning lamp is being viewed.

14. A system as defined in claim 12, wherein said warning lamp and said short applying means are disposed on a trailer, and said micro controller is configured to provide that said micro controller need not be electrically connected to a tractor or a computer to enter into said diagnostic modes.

15. A system as defined in claim 12, wherein said short applying means is a switch which is configured to be actuated by hand.

16. A method of using a brake system diagnostic device on a vehicle to determine what problems have been detected in relation to a brake system of the vehicle, said method comprising:

providing a micro controller on said vehicle, said micro controller having a stored program therein;

providing a warning lamp on said vehicle, said warning lamp being in electrical connection with said micro controller by a first line and being connected to ground by a second line;

providing means for applying a short across said warning lamp by connecting said first line to said second line a number of times to cause the brake system diagnostic device to enter into one of a plurality of diagnostic modes;

actuating said short applying means while standing generally proximate a warning lamp of said vehicle; and watching how many times said warning lamp blinks to determine what has been detected by the brake system diagnostic device.

17. A method as defined in claim 16, wherein said short applying means is a switch and further comprising the step of actuating said switch by hand.

18. A method as defined in claim 16, wherein said warning lamp and said short applying means are provided on a trailer, and said method further comprises the step of directing said brake system diagnostic device to enter into one of said diagnostic modes without electrically connecting said trailer to a tractor or to a computer.

* * * * *